US012668074B2

(12) United States Patent
Kostenbader

(10) Patent No.: US 12,668,074 B2
(45) Date of Patent: Jun. 30, 2026

(54) CLAMPING FIXATION OF NUMBERING UNITS

(71) Applicant: Zeiser GmbH, Emmingen-Liptingen (DE)

(72) Inventor: Oliver Kostenbader, Tuttlingen (DE)

(73) Assignee: ZEISER GMBH, Emmingen-Liptingen (DE)

( * ) Notice: Subject to any disclaimer, the term of this patent is extended or adjusted under 35 U.S.C. 154(b) by 125 days.

(21) Appl. No.: 18/044,312

(22) PCT Filed: Sep. 10, 2021

(86) PCT No.: PCT/DE2021/100750

§ 371 (c)(1),
(2) Date: Jun. 24, 2024

(87) PCT Pub. No.: WO2022/053109

PCT Pub. Date: Mar. 17, 2022

(65) Prior Publication Data

US 2024/0424816 A1 Dec. 26, 2024

(30) Foreign Application Priority Data

Sep. 10, 2020 (DE) ......................... 102020123680.8

(51) Int. Cl.
*B41K 3/12* (2006.01)

(52) U.S. Cl.
CPC ................................... *B41K 3/126* (2013.01)

(58) Field of Classification Search
None
See application file for complete search history.

(56) References Cited

U.S. PATENT DOCUMENTS

| | | | |
|---|---|---|---|
| 5,660,106 | A | 8/1997 | Pitz et al. |
| 2010/0000427 | A1 | 1/2010 | Würsch et al. |
| 2013/0289771 | A1 | 10/2013 | Waizenegger et al. |

FOREIGN PATENT DOCUMENTS

| | | | |
|---|---|---|---|
| DE | 29501349 | U1 | 4/1996 |
| DE | 102006052183 | A1 | 5/2008 |
| DE | 102011100847 | A1 | 11/2012 |
| EP | 0718112 | A1 | 6/1996 |
| EP | 4446273 | A1 | 6/1996 |
| JP | 2006224519 | A | 8/2006 |
| JP | 2010500201 | A | 1/2010 |
| JP | 2016175278 | A | 10/2016 |
| WO | 2013160426 | A1 | 10/2013 |

*Primary Examiner* — Joshua D Zimmerman
(74) *Attorney, Agent, or Firm* — Slater Matsil, LLP

(57) ABSTRACT

Embodiments provide a numbering unit including an upper part, a lower part and a clamping fixation providable between the upper part and the lower part.

21 Claims, 2 Drawing Sheets

CLAMPING FIXATION OF NUMBERING UNITS

CROSS-REFERENCE TO RELATED APPLICATIONS

This patent application is a national phase filing under section 371 of PCT/DE2021/100750, filed Sep. 10, 2021, which claims the priority of German patent application 102020123680.8, filed Sep. 10, 2020, each of which is incorporated herein by reference in its entirety.

TECHNICAL FIELD

The present invention relates to the clamping fixation of numbering units, in particular mechanical numbering units, but also electromechanical numbering units.

BACKGROUND

The numbering units mentioned above are known from EP 0 718 112 A1, DE 295 01 349 U1, DE 44 46 273 A1, DE 10 2006 052 183 A1 and DE 10 2011 100 847 A1, among others.

Such numbering units are used in particular for applying, and in particular printing, a security feature on security documents. In this context, the numbering unit can also be referred to as a numbering printing unit or a printing unit.

In particular, known numbering units are used to apply serial numbers to security documents, in particular banknotes.

In a common arrangement, a numbering unit is arranged on a mounting ring of a numbering machine (printing machine) in a reversible manner, i.e. fixed but can be released again if desired. The numbering unit is located on the outside of the mounting ring, and the type wheels of the unit are arranged on the side which is facing away from the mounting ring. The mounting ring is generally arranged on a numbering shaft of the numbering machine. Furthermore, the numbering units are located on the outside of the mounting ring.

The sheet to be printed (in particular a sheet of paper with banknotes to be numbered) is then fed to the numbering machine. In the numbering machine, the mounting ring with the numbering units fixed to the outside of the ring rolls on the sheet to be printed, whereby the individual security documents are each provided with a security feature, in particular a serial number, by the individual numbering units. In general, a plurality of mounting rings per numbering shaft and a plurality of numbering units per mounting ring, namely distributed around the circumference of the mounting ring, are provided. This is known per se and is not the subject of the present invention.

In general, numbering units also have a mechanism that advances the preset serial number by one unit at a desired digit of the number after each printing process, or each time the unit and mounting ring rotate, so that the next document can be printed with a vacant or subsequent serial number. To achieve this, the respective type wheel of the numbering unit is usually rotated by one position. This is known per se and is not the subject of the present invention.

The numbering unit can be divided into two parts and comprise an upper and a lower part (upper part and lower part). In particular, the lower part can be fixed to the mounting ring by clamping, but may be detachable again.

The upper part of the numbering unit generally comprises the type wheels and the entire numbering mechanism, which in itself is known in the art. These parts must generally be designed to be quickly removable from the mounting ring, so that the numbering machine does not have to be shut down for too long if the numbering mechanism needs to be replaced, e.g. in the event of defects, wear or a change to the print job.

The lower part of the numbering unit may remain on the mounting ring and only the upper part needs to be removed and replaced, if necessary. This means that the position of the numbering unit on the mounting ring remains unchanged and the clamping between the numbering unit and the mounting ring does not need to be loosened.

On the other hand, removing the lower part of the unit from the mounting ring for the purpose of replacing a numbering unit is disadvantageous and should be avoided, as the positioning of the lower part on the mounting ring has to be carried out with the smallest tolerances. In this respect, replacing the entire numbering unit would take an unacceptable amount of time.

The detachable connection between the upper part and the lower part of the numbering unit could be provided by one or more screw connections.

However, this exhibits several disadvantages. Firstly, considerable set-up times are required to unscrew all the numbering units, i.e. their respective upper parts, from the lower part of the unit, or from the mounting ring, respectively, and to screw the replaced upper parts back on again. Also, tools are required for replacement. Finally, screws can be lost unintentionally during the conversion and fall into the numbering machine, where they can cause considerable damage and therefore considerable downtime.

SUMMARY

Embodiments overcome disadvantages known from the prior art.

Further embodiments provide a fast, simple, safe, error-free and exact interchangeability and positioning of numbering units.

The invention is based on the idea of providing a numbering unit with the possibility of clamping fixation between an upper part and a lower part of the numbering unit.

The lower part of the numbering unit is preferably reversibly attachable, in particular clampable, to a mounting ring of a numbering machine, and may remain on the mounting ring when the upper part is replaced. This eliminates the need to replace the entire numbering unit, and thus also a very time-consuming realignment on the mounting ring. When the clamping fixation is being established with the lower part remaining on the mounting ring, the new upper part will automatically and instantly be positioned exactly.

The upper part of the numbering unit can preferably be removed from the lower part of the unit by loosening a separate clamping connection. On the other hand, the upper part can preferably be fixed to a lower part, in particular a lower part which is arranged on a mounting ring, by establishing a clamping connection.

The screw connection described above between the upper part and the lower part can thus be omitted, avoiding the disadvantages described above. Thus, a replacement of the respective upper parts of numbering units is achieved much more quickly, safely and, if necessary, even without tools.

In the following, the aspects of the invention are discussed further, for which purpose reference is made in part to non-limiting advantageous embodiments and further developments of the invention. The features of advantageous further developments can be implemented individually or in any combination, whereby further advantageous embodiments of the invention are created.

A preferred embodiment is one in which a clamping fixation can be established or is established between the upper part and the lower part of the numbering unit.

Preferably, the lower part is fixed to a mounting ring of a numbering machine, but can be detached again.

According to another advantageous embodiment, the lower part can remain on the mounting ring of a numbering machine if the upper part is replaced.

The lower part of the numbering unit is also preferably designed so that it can be clamped to a mounting ring of a numbering machine.

In a further advantageous embodiment, the lower part comprises a clamping lever with an opposing clamping hook, through the mutual tensioning of which the lower part can be fixed on a mounting ring of a numbering machine.

Preferably, screws extend through the clamping hook into the lower part.

A particularly preferred embodiment of the numbering unit according to the invention is one in which the upper part comprises a numbering mechanism.

Preferably, the upper part of the numbering unit comprises type wheels.

Particularly preferably, the upper part can be fixed to the lower part, in particular to the lower part thereby being arranged on a mounting ring of a numbering machine, by establishing a clamping connection, and can be removed from the lower part by releasing the clamping connection.

Preferably, the upper part can comprise at least one, preferably two, more preferably two opposing, tensioning levers.

It is advantageous if the tensioning levers extend from the upper part into a recess, an undercut, a groove, or the like, in the lower part, and can thus secure, fix or clamp the upper part to the lower part.

Alternatively or additionally, the lower part may also comprise at least one, preferably two, more preferably two opposing, tensioning levers.

The tensioning levers can preferably extend from the lower part into a recess, an undercut, a groove or the like in the upper part, and can thus secure, fix or clamp the upper part to the lower part.

It is advantageous if two tiltable tensioning levers are arranged on the upper part and/or two tiltable tensioning levers are arranged on the lower part, the two levers being arranged diagonally opposite one another.

In a further preferred embodiment, a spring is arranged between a tensioning lever and the respective part, i.e. upper part or lower part, to which the tensioning lever is assigned, which pretensions the tensioning lever and thus prevents the upper part or the lower part, respectively, from being released from the respective opposite part (lower part or upper part), when the tensioning lever is engaged.

Preferably, the tensioning lever can be pivoted away from the opposite part by actuating the tensioning lever against the force of the spring, and the upper part and the lower part can thus be removed from each other.

Preferably, the tensioning lever can pivot into the opposite part when an actuation of the tensioning lever is withdrawn, and can thus fix and/or clamp the upper part to the lower part.

In an advantageous manner, the tensioning levers can each comprise an actuation section for actuation by a user and a hook section for engagement with the opposite part.

Preferably, a tensioning lever can engage with its hook section in a lateral recess in the lower part.

In a preferred manner, the tensioning levers can be arranged essentially vertically.

In terms of defined positioning, the underside of the upper part can engage with a lug in a central groove of the lower part.

BRIEF DESCRIPTION OF THE DRAWINGS

Supplementary or in addition to the advantageous embodiments and further developments of the teaching already discussed, embodiments of devices according to the invention shown to the extent of FIGS. 1 and 2 are explained in more detail in the drawings. However, the examples discussed with reference to the drawings do not limit the invention to the examples shown. In discussing the embodiments with reference to the drawings, generally preferred embodiments and further developments of the teaching are also shown.

Further developments of the advantageous embodiments described above with features of the embodiments described below, just like further developments of the embodiments described below with features of the embodiments described above, expressly form further advantageous embodiments of the invention, and thus form part of the present disclosure.

DETAILED DESCRIPTION OF ILLUSTRATIVE EMBODIMENTS

Figure 1:
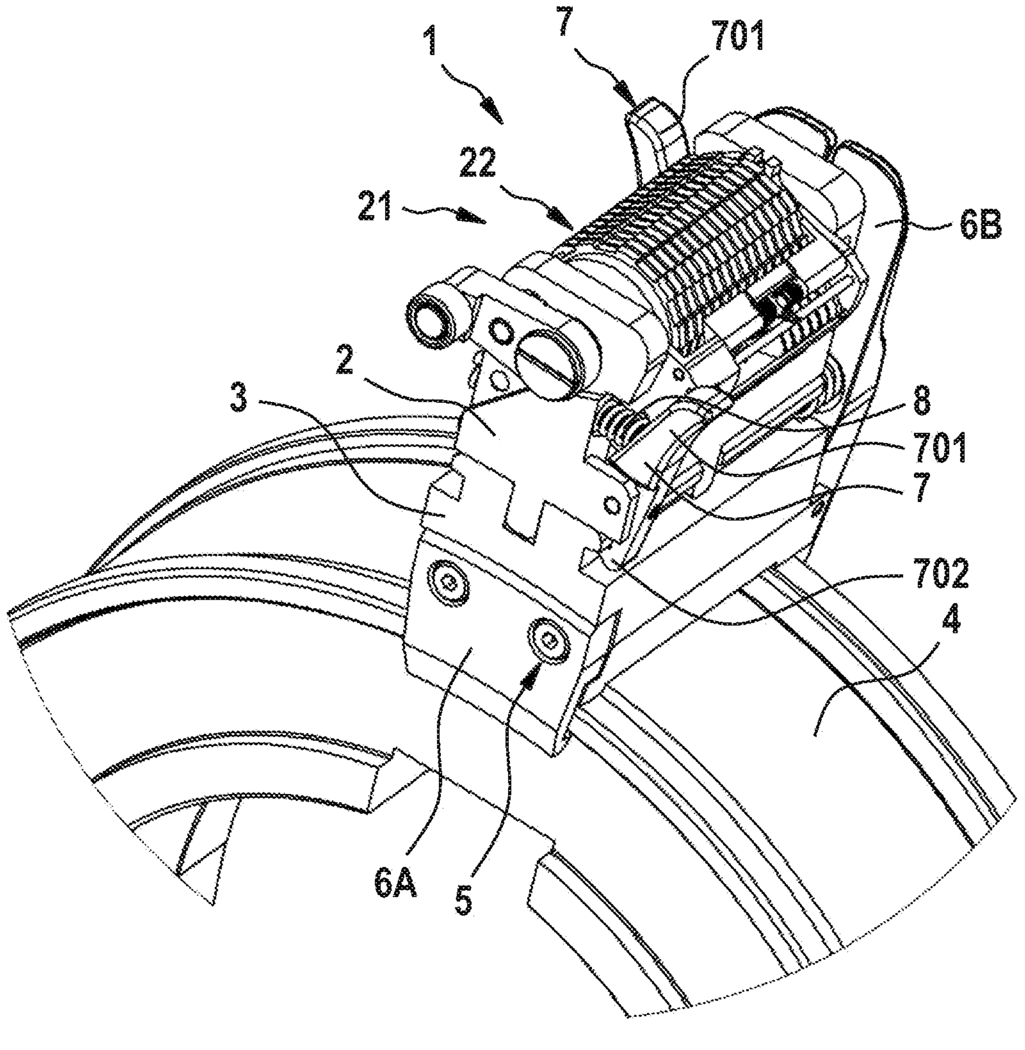
FIG. 1 shows a preferred embodiment of a numbering unit according to the invention, which in turn comprises an upper part and a lower part.

FIG. 1 shows a preferred embodiment of a numbering unit 1 according to the invention. The numbering unit 1 comprises an upper part 2 and a lower part 3.

Here and exemplary, the lower part 3 is reversibly fixed to the mounting ring 4 of a numbering machine (not shown). For this purpose, screws 5 extend through the clamping hook 6A on the front side. The clamping hook 6A and clamping lever 6B are clamped against each other by the opposite clamping lever 6B, whereby the lower part 3 is fixed to the mounting ring 4.

In the upper part 2, two tiltable tensioning levers 7 are arranged diagonally opposite each other. The tensioning levers 7 extend essentially vertically and comprise an actuation section 701 at the top for the user and a hook section 702 at the bottom (see FIG. 2) for engagement in the lower part 3.

A spring 8 acts between the upper part 2 and each tensioning lever 7, pretensioning the tensioning lever 7 in a suitable manner.

In a similar way, the clamping lever 6B of the lower part 3, which acts on the mounting ring 4, is pretensioned by its own springs. In this respect, a reversible fixation of the lower part 3 on the mounting ring 4 is also provided here.

The upper part 2 comprises the numbering mechanism 21 with the type wheels 22.

Further in relation to the upper part 2, the user can pivot the tensioning levers 7 away from the lower part 3 by actuating them against the force of the springs 8 and thus remove the upper part 2 from the lower part 3 very quickly. Conversely, the upper part 2 can in this way be moved towards the lower part 3 and be arranged or engaged on the latter. By withdrawing the actuating force on the tensioning levers 7, these then pivot into the lower part 3, and thus the upper part 2 is fixed and/or clamped to the lower part 3. This connection between upper part 2 and lower part 3 can also be established in just a few seconds.

Figure 2:
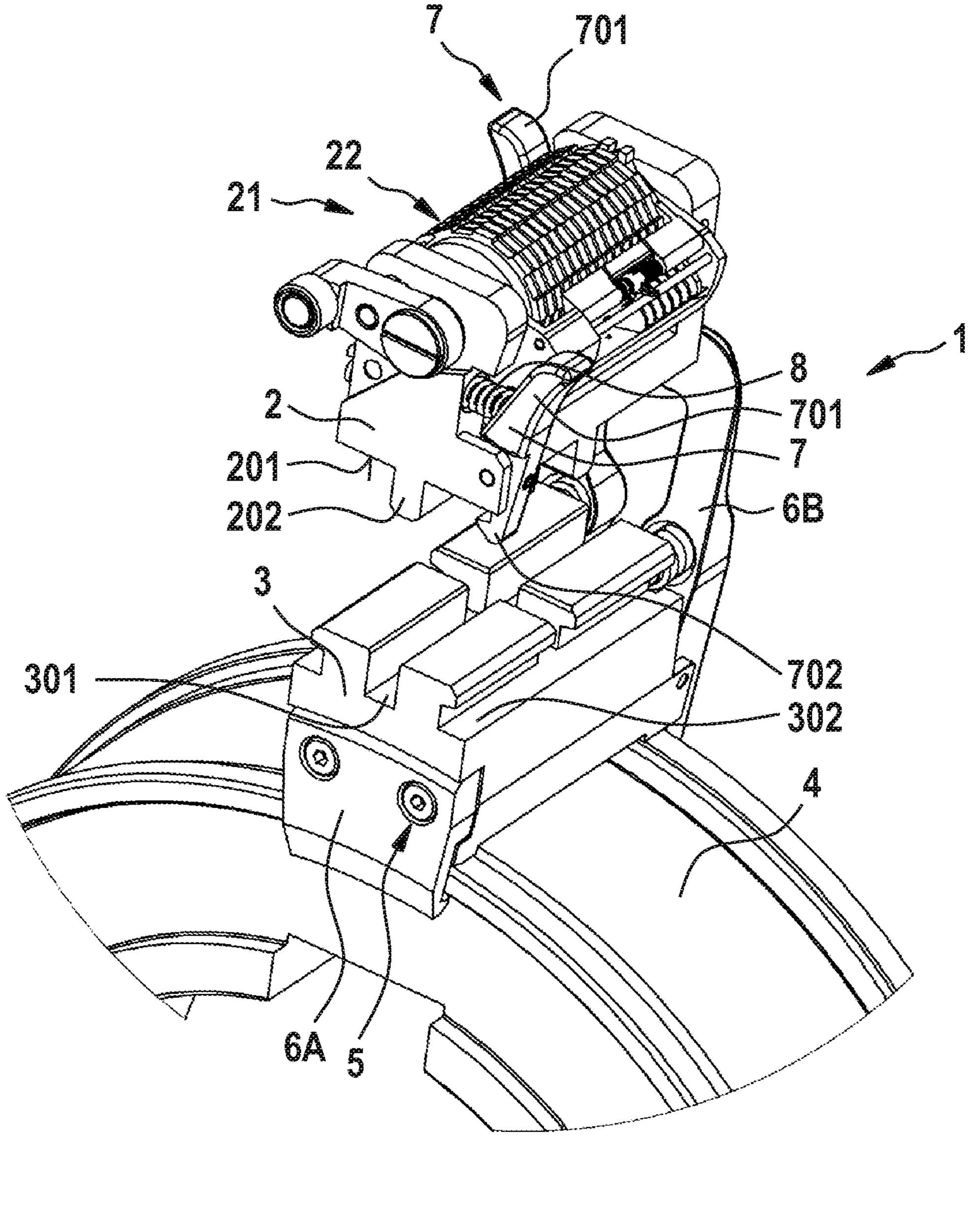
FIG. 2 shows an embodiment from FIG. 1 in an exploded view, with the upper part and the lower part of the numbering unit shown at a distance from each other.

FIG. 2 shows the embodiment from FIG. 1 in an exploded view, with the upper part 2 and the lower part 3 of the numbering unit 1 shown at a distance from each other.

It can be clearly seen here that the underside 201 of the upper part 2 engages with a lug 202 in a central groove 301 of the lower part 3. The tensioning levers 7, whose lower hook section 702 is clearly visible here, also engage in further suitable lateral recesses 302 or grooves in the lower part 3.

Furthermore, both the lug 202 and the central groove 301 comprise a corresponding cross shape, i.e. the lug 202 and the central groove 301 each comprise portions oriented perpendicularly to one another. This inevitably leads to an exact positioning of the upper part 2 relative to the lower part 3 when the upper part 2 is advanced to the lower part 3, as there no longer exist any degrees of freedom in the positioning of the upper part 2 perpendicularly to the underside 201 of the upper part 2.

With regard to FIG. 2, it should otherwise be noted that reference signs already shown in FIG. 1 and already explained above in this respect are not explained again in part with reference to FIG. 2. For the explanation of such reference signs and the associated technical features, reference is made in full to the above description of FIG. 1 in order to avoid repetition.

The invention claimed is:

1. A numbering unit comprising:

an upper part;

a lower part; and a clamping fixation configured to establish a connection or disconnection between the upper part and the lower part, wherein the upper part comprises a numbering mechanism.

2. The numbering unit according to claim 1, wherein the lower part is configured to be fixed firmly, but detachably, to a mounting ring of a numbering machine.

3. The numbering unit according to claim 1, wherein the lower part remains on a mounting ring of a numbering machine when the upper part is replaced.

4. The numbering unit according to claim 1, wherein the lower part is configured to clamp to a mounting ring of a numbering machine.

5. The numbering unit according to claim 1, wherein the lower part comprises a clamping lever and an opposing clamping hook, and wherein the lower part is fixable on a mounting ring of a numbering machine via mutual tensioning of the clamping lever and the clamping hook.

6. The numbering unit according to claim 5, further comprising a screw extending through the clamping hook into the lower part.

7. The numbering unit according to claim 1, wherein the upper part further comprises type wheels.

8. The numbering unit according to claim 1, wherein the upper part is fixable to the lower part by establishing a clamping connection, and wherein the upper part is removable from the lower part by releasing the clamping connection.

9. The numbering unit according to claim 8, wherein the upper part comprises at least one tensioning lever, or wherein the lower part comprises at least one tensioning lever.

10. The numbering unit according to claim 9, wherein the at least one tensioning lever extends from the upper part into a recess, an undercut or a groove in the lower part thereby securing, fixing or clamping the upper part on the lower part, or wherein the at least one tensioning lever extends from the lower part into a recess, an undercut, or a groove in the upper part thereby securing, fixing or clamping the upper part on the lower part.

11. The numbering unit according to claim 9, wherein two tiltable tensioning levers are arranged on the upper part and/or two tiltable tensioning levers are arranged on the lower part, the two levers being arranged diagonally opposite one another.

12. The numbering unit according to claim 9, further comprising at least one spring arranged between the at least one tensioning lever and a respective upper or lower part to which the at least one tensioning lever is assigned, the at least one spring configured for pretension of the at least one tensioning lever thereby preventing the upper part or the lower part from being released from a respective other part when the at least one tensioning lever is engaged.

13. The numbering unit according to claim 12, wherein, when the at least one tensioning lever is actuated against a force of the at least one spring, the at least one tensioning lever is pivotable away from the other part so that the upper part and the lower part are removable from one another.

14. The numbering unit according to claim 12, wherein, when an actuation is withdrawn, the at least one tensioning lever is pivotable into the other part so that the upper part is fixable and/or is clampable to the lower part.

15. The numbering unit according to claim 9, wherein the at least one tensioning lever comprises an actuation section configured for a user and a hook section configured for engagement with the other part.

16. The numbering unit according to claim 15, wherein the at least one tensioning lever is configured to engage with the hook section in a lateral recess in the lower part.

17. The numbering unit according to claim 15, wherein the at least one tensioning lever is arranged vertically.

18. The numbering unit according to claim 1, wherein an underside of the upper part is configured to engage with a lug in a central groove of the lower part.

19. A numbering machine comprising:

the numbering unit according to claim 1.

20. A numbering unit comprising:

an upper part;

a lower part; and a clamping fixation configured to establish a connection or disconnection between the upper part and the lower part, wherein the upper part comprises type wheels.

21. A numbering unit comprising:

an upper part comprising a numbering mechanism and type wheels; and a lower part, wherein the lower part comprises a clamping lever and an opposing clamping hook, and wherein the lower part is fixable on a mounting ring of a numbering machine via mutual tensioning of the clamping lever and the clamping hook, wherein the upper part is fixable to the lower part by establishing a clamping connection, and wherein the upper part is removable from the lower part by releasing the clamping connection.

* * * * *